April 9, 1963     J. M. CALDWELL     3,084,957

BELLOWS CONDUIT COUPLING WITH STRAIN RELIEF CABLE

Filed Sept. 21, 1960

*INVENTOR.*
JOSEPH M. CALDWELL

BY R. E. Geaugue

ATTORNEY

United States Patent Office 3,084,957
Patented Apr. 9, 1963

3,084,957
BELLOWS CONDUIT COUPLING WITH STRAIN RELIEF CABLE
Joseph M. Caldwell, 8256 San Fernando Road, Sun Valley, Calif.
Filed Sept. 21, 1960, Ser. No. 57,469
2 Claims. (Cl. 285—114)

This invention relates to flexible metallic conduit couplings and more particularly relates to a novel coupling incorporating a metallic bellows having tension and pressure absorption means.

In the past, difficulties have been encountered with conventional conduit flexible couplings which stem largely from a fact that the couplings are subject to varying pressure and tension when installed in a conduit or ducting system which flexes to accommodate angular deflection between a pair of conduit or duct ends and which expands longitudinally as the conduit ends move toward and away from each other. The metals used in the manufacturing of flexible metallic bellows are carefully compounded and heat treated to provide the maximum of flexibility and at the same time maintain a high degree of strength. The bellows is generally joined to the opposing ends of the pair of conduits by seam welding and it is through this joint that the pressure and tension produced by the flexing action is applied to the ducting system.

However, in accordance with the present invention novel means are provided about the flexible bellows for absorbing such pressure and tension which includes a tensioned cable and a pulley arrangement for restricting, directing and limiting the bellows movement.

Accordingly, it is an object of the present invention to provide a flexible metallic conduit coupling of light weight, compact and durable construction, having a flexible metallic bellows arranged to accommodate angular movements between a pair of conduits without imparting pressure and tension to the ducting system.

A further object of the present invention is to provide a conduit coupling structure which will absorb and accommodate angular axial motions as well as longitudinal movements and bending moments and stresses.

Still a further object of the present invention is to provide a conduit coupling structure which will be durable and at the same time while in service will absorb substantially all external pressures and tension through the employment of a tensioned pulley and cable arrangement.

Still a further object of the present invention is to provide a conduit structure employing a flexible bellows coupled between opposing conduit or duct ends which includes novel means for protecting the bellows against abrasive wear should the pulley and cable tensioning arrangement rotate about the bellows.

Another object of the present invention is to provide a novel tensioning and restraining arrangement for a conduit coupling incorporating a flexible metallic bellows which not only restrains against the bellows and limits the amount of longitudinal displacement of the bellows but absorbs substantially all external coupling pressure so that the joint between bellows and conduit is not subject to early fatigue and no parallel offset between opposing conduit ends can result.

Various other objects, advantages and features of the present invention will be apparent from the following specification when taken in connection with the accompanying drawings, in which.

Figure 1:
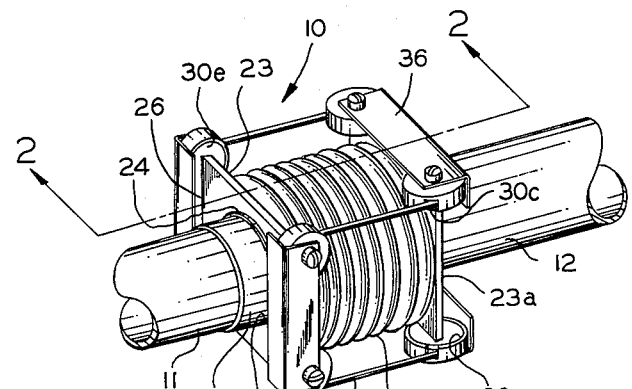
FIGURE 1 is a perspective view of a conduit coupling embodying the present invention.
Figure 2:
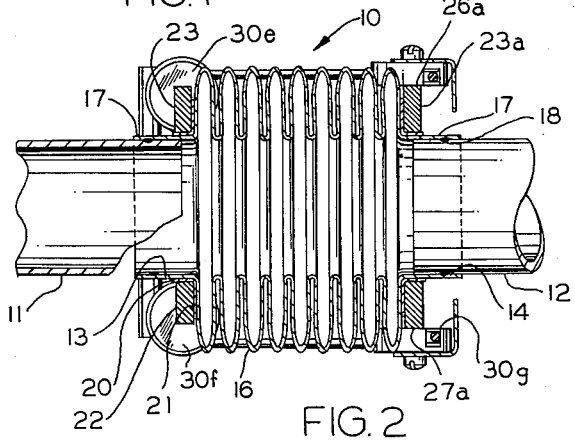
FIGURE 2 is a sectional view of the conduit coupling of FIGURE 1 taken in a direction of arrows 2—2.

Referring to FIGURES 1 and 2 of the drawing illustrating a conduit coupling employing the present invention represented in general by the numeral 10, there is shown a pair of conduit or duct sections 11 and 12 arranged with their terminal end portions 13 and 14 opposing each other for carrying a fluid substance within a ducting system (not shown).

The opposing terminal end portions of the conduit sections are flexibly coupled together to provide an enclosed continuous passage therebetween by means of a metallic bellows 15 having a plurality of expandable accordion-type convolutions such as convolution 16. The extreme opposite ends of the bellows are provided with an integral annular collar 17 of suitable diameter to be received over a mating conduit terminal end portion in a telescoping fashion. Although the annular collar 17 may be secured to the terminal end portions by any suitable means, it has been preferred to employ a seam weld 18 to join the respective parts so that the bellows is securely fastened between the conduit terminal end portions.

Thus far in the description of the present invention, the terminal end portions 13 and 14 have been connected together by means of a flexible bellows 15 such that a continuous fluid passage is provided between the conduits and which permits longitudinal expansion of the conduits relative to each other in which case the bellows will expand due to the flexible nature of the bellows and the plurality of convolutions provided therein. Also, the conduit end portions are permitted angular deflections respective to one another since the convolutions in the bellows 15 readily compensate for any expansion or contraction which is required to accommodate the relative angular deflection. However, in order to restrain and limit the expansion of the bellows as well as absorbing all external loads produced by such angular deflection, means are provided about the bellows construction which are biased to constrict the bellows configuration in order to absorb pressure and tension produced by the angular deflection between conduit sections 11 and 12. Such means comprises, in general, an annular member 20 which is fixed to the outer surface of each collar 17 by suitable means such as welding for example, and which includes an integral flange 21 extending radially outward from the collar adjacent to and in support of the end bellows convolutions. The outward extension of the flange terminates approximately in the middle of the adjacent bellows convolution.

Seated about each member 20 and adjacent flange 21, there is provided a base plate 23 and 23a associated with each end of the bellows. Each plate is provided with an annular aperture or hole 24 so that the plate may be easily slid over the conduit sections 11 and 12 into the seated position on member 20. Each base plate presents a pair of parallel mounting surfaces 26 and 27 and 26a and 27a respectively which are formed from opposite sides of the base plate. Mounting surfaces 26 and 27 associated with base plate 23 appearing on the left hand side of the bellows in the drawing are arranged vertically while the mounting surfaces 26a and 27a associated with the base plate 23a appearing on the right hand side of the bellows shown in the drawing are formed horizontally. Each base plate assumes the configuration of a square so that its respective corners project outwardy beyond the periphery of the annular bellows configuration so that effectively eight projected corners are provided so that a cable and pulley arrangement may be mounted on the respective mounting surfaces without interference with the bellows during deflection or interference with other adjacent structure.

The cable and pulley arrangement comprises, in general, a plurality of pulleys, 30 through 30g, mounted on the mounting surfaces of the eight projecting corners of the base plates. The pulleys are arranged so that the pulleys associated with one plate, such as the plate shown on the left hand side of the bellows in the drawings are parallel to one another and operate to rotate in a vertical direction while the pulleys associated with the base plate on the right hand side of the bellows as shown in the drawings are mounted on the respective mounting surfaces to rotate in a horizontal direction.

An endless cable 31 is suitably trained over the pulley wheels so that the pair of base plates are connected in a unitary construction and adequate tension is applied to the cable so that the cable and pulley arrangement is constricted about the bellows via the base plates. Although not shown, the cable is endless and may be provided with clamps or clips on the opposite ends of the cable which when connected permit the cable to operate in an endless manner. The cable is laced between the plurality of pulleys such that the cable covers at least a quarter of the pulley engaging surface of each pulley. The cable is laced such that the cable continues from the pulley shown with reference numeral 30 associated with the base plate 23a to the vertically rotating pulley 30a on the opposite base plate 23 where the cable continues upward to the upper vertical pulley 30b and then passed to the horizontal pulley 30c on the upper mounting surface 26a of the base plate 23a. The cable is trained next over the upper horizontal pulley 30d on the other side of the base plate 23a followed by training the cable over the vertically rotating pulley 30e associated with the base plate 23 shown on the left hand side of the drawings where the pulley next travels downward about the pulley wheel 30f. Next, the cable is trained over the lower right hand pulley 30g associated with the base plate 23a and connection is made with the opposite end of the cable between pulleys 30 and 30g so that an endless dynamic cabling system is provided adaptable to move around the pulleys responsive to bellows flexing.

Figure 3:
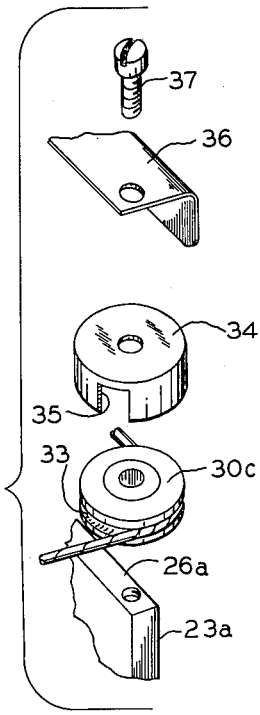
FIGURE 3 is an exploded enlarged view illustrating a portion of the restraining cable and pulley assembly employed in the conduit coupling of FIGURES 1 and 2.

With reference to FIGURE 3 of the drawings, it is to be noted that the cable 31 is trained through a groove 33 provided about the annular surface of the pulley and that the pulley including the cable portion engaged with the pulley is protected by a cover 34 suitably provided with cutouts 35 to permit the cable to train over the pulley without interference therewith. A flange member 36 is provided as a protection means for the cable and is mounted directly on the respective base plates by means such as a screw 37 employed for securing member 36, cover 34 and pulley 30c to the mounting surface 26a of each base plate 23a.

Figure 4:
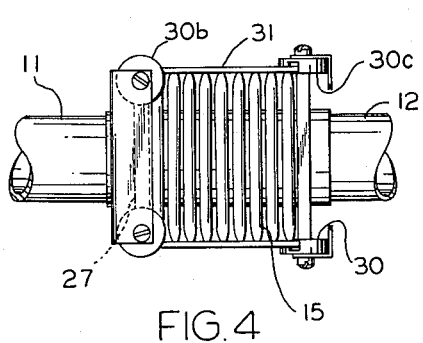
FIGURE 4 is a side elevational view of the conduit coupling of FIGURE 1 showing the pair of conduits coaxially coupled.
Figure 5:
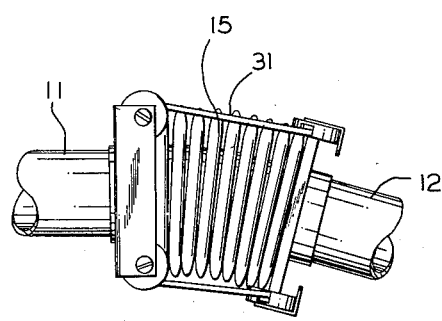
FIGURE 5 is a side elevational view of the conduit coupling of FIGURE 4 showing the pair of conduits angularly disposed with respect to each other.

With reference to FIGURE 4 of the drawings, the conduit coupling of the present invention is shown having the base plates 23 and 23a mounted adjacent opposite ends of the bellows and including the cable and pulley arrangement for tensioning the bellows and further showing the conduits in a normal installation. FIGURE 5, however, shows the conduits angularly deflected with the lower portion of the bellows convolutions compressed while the upper portion of the convolutions are expanded to accommodate the deflection. Also, the cable is seen to be shortened on the lower portion of the coupling while the cable associated with the upper portion is extended. Since the cable is endless, the cable may easily train about the pulleys so that such an arrangement is accommodated responsive to the deflection of the pair of conduits. It is noted that the cable and pulley tension arrangement receives the full external load of the pair of conduits via the base plates and that the extension of the bellows is restricted to the stretch provided in the cabling for longitudinal movement between the conduits. If desirable, it is within the scope of the invention to include spring biasing devices within the cable arrangement so that the extension of the bellows can be regulated thereby. It is further noted that should the base plates be rotated about members 20, or should the angular deflection between the conduits become severe, that the flanges 21 protect the end convolution of the bellows from abrasive action generated between moving parts under such circumstances.

Through the employment of the present invention, the service life of bellow-type flexible joints is greatly extended and the economies associated with the construction and installation of the cable and pulley arrangement can be recognized as well. The difficulties of absorbing and restraining external pressure is overcome in the device of the present invention by employing the cable and pulley arrangement for tensioning the bellows prior to and during its flexing operation.

Having described only a typical form of the invention, I do not wish to be limited to the specific details herein set forth, but wish to reserve to myself any variations or modifications that may appear to those skilled in the art or fall within the scope of the following claims.

What is claimed is:

1. A duct coupling comprising
   a pair of duct sections normally in axial alignment,
   a flexible bellows disposed between the duct sections and sealed thereto,
   a square base plate rotatably mounted on each of the duct sections and normally in a position wherein an edge of one base plate is parallel to a corresponding edge of the other base plate,
   pulleys mounted on each of the base plates, one at each corner thereof,
   the pulleys on one plate being mounted on parallel axes,
   the pulleys on the other plate being also mounted on parallel axes but normally at right angles to the mounting axes of the pulleys on said one plate,
   and a tensioned endless cable trained over the pulleys to connect the pair of base plates,
   said cable being adapted to travel over said pulleys to adjust itself to rotational movement of said plates as well as to angular displacement of the planes of said plates, to relieve the bellows of substantial strain during flexing and to limit expansion thereof.

2. In combination with the structure as set forth in claim 1, a cover over each pulley,
   said cover embracing the pulley and cable,
   and cutouts in each cover for enabling the cable to traverse the spaces between said pulleys.

References Cited in the file of this patent

FOREIGN PATENTS 695,015     Great Britain _____ Aug. 5, 1953